Figure 1:
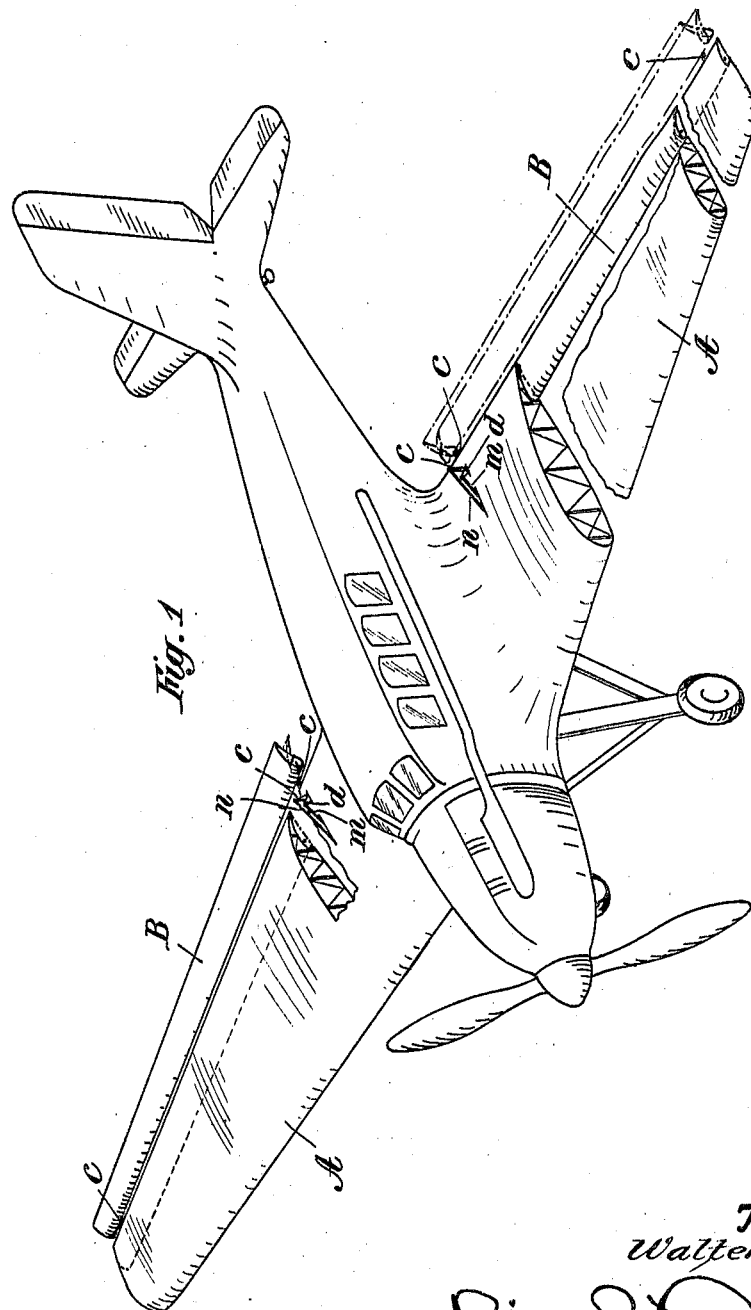

Dec. 6, 1938.   W. BLUME   2,138,952
AUXILIARY WING FOR AIRCRAFT
Filed Dec. 6, 1937   2 Sheets-Sheet 1

Inventor:
Walter Blume,
Bailey & Carson
Attorneys

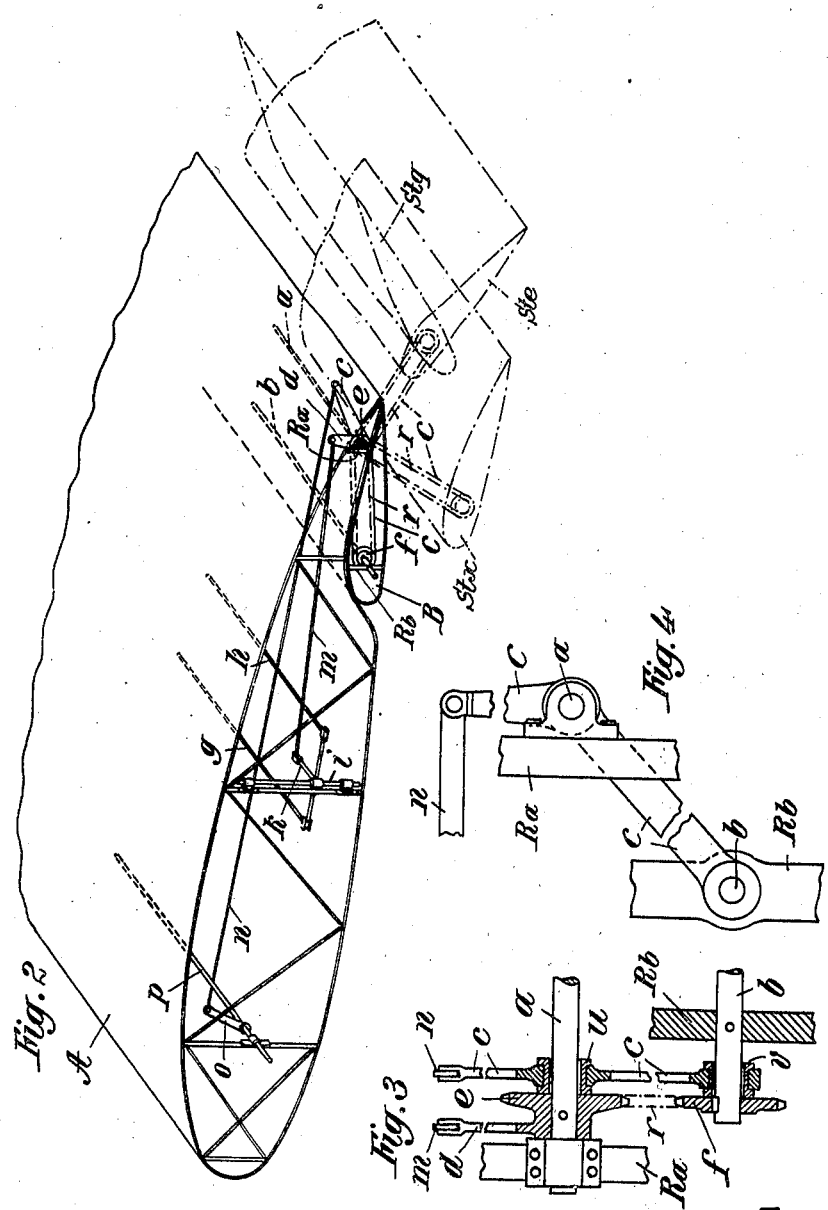

Patented Dec. 6, 1938

2,138,952

UNITED STATES PATENT OFFICE 2,138,952

AUXILIARY WING FOR AIRCRAFT

Walter Blume, Brandenburg, (Havel), Germany, assignor of one-half to Arado Flugzeugwerke Gesellschaft mit beschrankter Haftung, Brandenburg, (Havel), Germany, a company of Germany Application December 6, 1937, Serial No. 178,377
In Germany August 31, 1935

5 Claims. (Cl. 244—42)

For improving the aerodynamic properties of the wing unit of aircraft so-called auxiliary wings or flaps are known which extend over the whole span of the main wing and during flight can be projected rearwards from the wings on the undersides of the wings. As a result in addition to increase of the camber an increase in the wing surface in a direction of the depth of the wing is attained. In contradistinction to high speed flight in slow flight the loading surface is thus smaller. To increase the wing surface in the direction of the chord the auxiliary wing which often also has a wing profile and in its inoperative position extends within the rear part of the main wing on being pushed out to its full width simultaneously is set downwardly usually to say 30° and more. In the end position between the rear edge of the main wing and the forward edge of the auxiliary wing in general is formed a nozzle like slot which delays or prevents the diversion of flow with great angles of incidence.

In the known arrangement referred to a separate aileron is provided for lateral control.

Wing arrangements are also known in which the auxiliary wing extends only over a part of the span of the wing. In such aircraft wings the auxiliary wing can be used also as an elevating flap only. The use of the auxiliary wing also as an aileron is not possible so that separate divided ailerons must be provided. Finally attempts have also been made to use the auxiliary wing in the whole breadth of the main wing and movable entirely out of it without an arrangement of a separate aileron for lateral control, by pushing outwards only the outer end of the auxiliary wing in question, the other end remaining within and beneath the main wing. However the effectiveness of the auxiliary wing as an aileron is practically only very slight as the outward movement of the auxiliary wing takes too much time.

The invention relates to auxiliary wings or flaps on aircraft which are arranged at the rear of the main wing, extend over the whole span and are swung out rearwardly from the main wing and can be turned about an axis transverse to the direction of flight.

The invention avoids the disadvantage of known constructions and permits a wing arrangement with a suitably adjustable and rapidly operable auxiliary wing to suit the conditions of flight at any time.

The invention consists essentially in the combination of a pivoted guide for swinging the auxiliary wing in the whole span of the main wing and of the full width from a recess shaped to the profile of the auxiliary wing beneath the rear part of the main wing with a device operable independently of the pivoted guide for adjusting the auxiliary wing either as an elevating flap or as an aileron.

Further features of the invention will appear from the following description of the embodiment of the improved aircraft auxiliary wing illustrated by way of example in the accompanying drawings.

Fig. 1 shows the auxiliary wing arrangement on an aeroplane in perspective, parts of the wing covering being removed for the sake of clearness, and different positions of the auxiliary wing in relation to the main wing being indicated. Fig. 2 shows a main wing and the auxiliary wing in part section through the wings at a rib, different settings of the auxiliary wing being indicated in dash and dotted lines. Fig. 3 shows diagrammatically in cross section to enlarged scale a part of the pivoted guide mentioned and the device for adjusting the auxiliary wing. Fig. 4 shows, to the scale of Fig. 3, a bell crank lever in side view serving as a pivoted guide for swinging out the auxiliary wing.

Referring to the drawings in the rear part of the main wing A a shaft $a$ is loosely rotatably mounted in or on ribs $Ra$, of which one is shown in section in Fig. 3. On this shaft $a$ is keyed a sprocket wheel $e$ with which a single armed lever $d$ is also rigidly connected. Moreover there is loosely mounted on the shaft $a$ a double armed lever $c$.

In the front part of the auxiliary wing B is provided a shaft $b$ which is mounted in a non-rotatable manner in the ribs $Rb$ of the auxiliary wing. On this shaft $b$ is mounted a sprocket wheel $f$ which is set in rotation from the sprocket wheel $e$ on shaft $a$ by way of a chain $r$. The shaft $b$ is moreover as shown in Fig. 3 traversed by the one end formed as a bearing $v$ of the double armed lever $c$.

In the main wing A is rotatably mounted at a suitable point a vertical spindle or pivot pin $i$ with which the double armed lever is rigidly connected. This lever is actuated by cables $g$, $h$ or the like from the pilot's seat. The rotation imparted to the shaft $i$ is transmitted through the links $k$, $m$ to the lever $d$ and thus as later described to the auxiliary wing B.

Finally in the ribs of the main wing A is also rotatably mounted a shaft $p$ on which is keyed a lever $o$. The end of the lever $o$ is connected with the end of the lever $c$ by a rod $n$.

If the auxiliary wing B is to be adjusted to act as an elevating flap the shaft p is so rotated that the double armed lever c is turned about the shaft a in counter-clockwise direction as seen by the observer of Fig. 2. The auxiliary wing B is thus moved away from the main wing A in the manner indicated in dash and dot lines in Fig. 2 (for example position Stx) and on further rotation of the shaft p passes into the end position Ste. During this pivoting movement the chain r passing over the sprocket wheels rolls over the sprocket wheels e, f.

If now the sprocket wheel e has a greater number of teeth than the sprocket wheel f the auxiliary wing B during the pivoting movement also alter its inclination in relation to the main wing A so that the angle of incidence of the auxiliary wing B gradually increases in relation to the angle of incidence of the main wing A. As shown in Fig. 2 a slot is left not only during the turning movement but also in the end position between the main and auxiliary wings which slot is limited by the length of the lever c. When the auxiliary wing B as soon as it is swung out sufficiently far is to be used as an aileron the cables g, h or the like are actuated through known and suitable means. The vertical shaft i is thereby turned and this rotation is transmitted through the links 6, 7, to the lever d. If for example the lever swings to the left about the shaft a (Fig. 2) this rotation is transmitted by the sprocket wheel e through the chain r to the sprocket wheel f. As the latter is keyed on the shaft b and the shaft is connected rigidly with the ribs Rb of the auxiliary wing B, the wing B turns together with the shaft b say into the position Stq.

In Fig. 1 the auxiliary wing B in the right hand half of the figure is shown in its retracted position within the main wing A, while the extended position of the auxiliary wing is shown in two different positions in dash and dotted lines corresponding to the positions Ste and Stq of Fig. 2.

In the left hand upper half of Fig. 1 the auxiliary wing B is shown as projected out from the main wing A and turned into a position corresponding to the position Stq of Fig. 2 in which it acts as an aileron. The projected position of the auxiliary wing B in which it acts as an elevating flap and the retracted position of the auxiliary wing are shown in dotted lines in the upper half of Fig. 1.

In the embodiment illustrated the auxiliary wing B is held and turned by two levers c engaging adjacent its two ends. It is however obviously possible to provide several supporting and turning levers c in a different arrangement and to distribute these over the whole width of the auxiliary wing.

I claim:

1. In an aircraft, a body, main wings on opposite sides of said body each having a recess along its trailing edge, auxiliary wings one disposed at the rear of each main wing, means pivoted to the main and auxiliary wings to guide each of the auxiliary wings for movement from a position within such recess to two other positions, one spaced below the main wing in which the auxiliary wings can move in the same direction to act as a camber changing device and the other in which the front edges of the auxiliary wings are spaced behind the trailing edges of the main wings and the auxiliary wings can move in opposite directions to act as ailerons.

2. In an aircraft, a body, main wings on opposite sides of said body each having a recess along its trailing edge, auxiliary wings one disposed at the rear of each main wing, means pivoted to the main and auxiliary wings to guide each of the auxiliary wings for movement from a position within such recess to two other positions, one spaced below the main wing in which the auxiliary wings act as lift-varying means and the other in which the front edges of the auxiliary wings are spaced behind the trailing edges of the main wings, and means operable to move the auxiliary wings when in said second positions in opposite directions so that the auxiliary wings act as ailerons.

3. In an aircraft, a body, main wings on opposite sides of said body each having a recess along its trailing edge, auxiliary wings one disposed at the rear of each main wing, means pivoted to the main and auxiliary wings to guide each of the auxiliary wings for movement from a position within such recess to two other positions, one of said positions being spaced below the main wing in which the auxiliary wings act as a camber changing device, means to tilt the auxiliary wings as they are moved toward said position, and the other position being one in which the front edges of the auxiliary wings are spaced behind the trailing edges of the main wings, and means operable to move the auxiliary wings when in said second positions in opposite directions so that the auxiliary wings act as ailerons.

4. In an aircraft, a main wing, an auxiliary wing disposed at the rear of the main wing and extending over the whole span thereof, guide means for said auxiliary wing comprising a shaft mounted in said main wing adjacent the rear edge thereof, a lever loosely mounted on said shaft, a second shaft fixed to said auxiliary wing and pivoted on said lever, said main wing having a recess adjacent its trailing edge, said guide means being adapted to swing the auxiliary wing from such recess to two main positions in one of which said auxiliary wing acts as an elevated flap while in the other main position it operates as an aileron, a sprocket wheel mounted on said first shaft, a second sprocket wheel rigid with said second shaft, and a chain engaging said sprocket wheels, one of said sprocket wheels having a greater number of teeth than the other whereby the chain tilts the auxiliary wing during its movement to the first position.

5. In a device as claimed in claim 4, means for turning said first sprocket wheel whereby said auxiliary wing may be turned in its position as an aileron.

WALTER BLUME.